Feb. 5, 1963 H. C. WATERS 3,076,928
LOGGING SYSTEM FOR EARTH FORMATIONS
Filed Nov. 12, 1958 2 Sheets-Sheet 2

INVENTOR.
HENRY C. WATERS
BY
ATTORNEY

United States Patent Office

3,076,928
Patented Feb. 5, 1963

3,076,928
LOGGING SYSTEM FOR EARTH FORMATIONS
Henry Clay Waters, Houston, Tex., assignor, by mesne assignments, to PGAC Development Company, Houston, Tex., a corporation of Texas
Filed Nov. 12, 1958, Ser. No. 773,218
16 Claims. (Cl. 324—1)

This invention relates to a system for logging earth formations and more particularly it relates to improved apparatus for simultaneously measuring and recording the resistivity, conductivity, and natural potential of earth formations adjacent a borehole.

It is well known that logs or curves of earth formations provide valuable geological information. One of the most useful of these logs is a log showing variations in natural earth potential. Another type of log that is desirable is the electrical log which provides a record of the resistivities of the formations. While this last mentioned log is generally advantageous in geological exploration, it is not always readily obtainable because in electrical logging a conductive medium is required to carry current from the logging tool into the formations. Where the borehole is empty or filled with a non-conductive fluid, such as an oil-based mud, a resistivity curve cannot be recorded. In these instances it has often been found advantageous to log the conductivity of the adjacent formations by means of an induction logging tool utilizing a transmitter coil to create an alternating field to energize the formations.

In induction logging the magnitude and frequency of the alternating magnetic field created by the transmitter coils are generally held constant. This constant magnetic field induces a constant voltage E in the various circular paths in the formations around the borehole. This voltage or potential difference causes circular currents I to flow in the formations around the borehole. These formation currents in turn create their own magnetic field which induces a signal in a receiver coil mounted in the tool. It will be seen that this signal is proportional to the currents flowing in the formations around the borehole. Since these currents I are proportional to $E/Rt$, where $Rt$ is the resistivity of the formation and E is constant, it is evident that the measured signal is proportional to $1/Rt$. By definition $1/Rt$ is known as the formation conductivity ($Ct$).

In conventional electrical logging, the conditions are reversed, since here the current I through the formation is held constant and a voltage measurement E is made across the formation. With this condition the measured signal E is proportional to $I \times Rt$, or $Rt$ (since I is constant). In other words, with the induction log, a signal is measured which is proportional to $1/Rt$, while with the electrical log a signal is measured which is proportional to $Rt$. In practice the electrical log has greater accuracy for high values of $Rt$; (for example, when $1/Rt$ approaches zero). On the other hand, when $Rt$ is small, $1/Rt$ becomes large and the induction log has greater accuracy. It is thus desirable to provide a common tool which can be used both for electrical and for induction logging, in order to ensure accurate logs over a wide range of formation resistivities. In view of the utility of the natural earth potential log in conjunction with resistivity and conductivity logs of the same formations, it would be highly advantageous if the common tool could also measure and record natural earth potential. In this regard it can be seen that the time required for the three different logging operations would be greatly reduced if a combination tool were devised that would enable the operator simultaneously to measure and record the three curves during one trip in the borehole. Also, a combination tool capable of performing three logging operations is obviously more convenient, less bulky and less expensive than three separate tools. Additionally, if means could be provided to plot the resistivity, conductivity, and natural potential logs as a single graph, it would substantially eliminate the possibility of overlooking possible producing strata in oil exploration due to curve error because of the supplemental information provided by each of the separate logs covering each location in the borehole. Also there would be no problem of correlation of the curves due to stretch of the graph medium and resulting errors in depth measurement.

Accordingly, it is a principal object of the present invention to provide improved apparatus for the simultaneous logging of the resistivity, conductivity, and natural potential of earth formations.

In measuring conductivity, the signal from mutual induction between the transmitter coil and the receiver coils must be nullified in order to obtain an accurate indication of the formation conductivity. Also, it is desirable that the formation under investigation at a given time be relatively narrow and thin, and located in a zone at a selected lateral distance from the axis of the borehole.

Thus another object of the invention is to provide an improved arrangement of transmitter and receiver coils for induction logging apparatus in which the coils are so spaced and interrelated that the mutual induction between coils is nullified and the conductivity of a selected, relatively narrow, thin formation may be measured with a high degree of accuracy.

Inasmuch as the conductivity of unknown formations must be measured with accuracy for meaningful results, it is desirable that the logging tool be calibrated by means of a known standard before logging an unknown formation. Accordingly, a further object of the present invention is to provide a new and improved device for calibrating an induction logging system by means of a standard of known conductivity.

Still another object of the present invention is to provided means to minimize mutual induction between transmitter and receiver coils in an improved logging system by the provision of a novel arrangement for adjusting the relative positions of certain of the coils to reach a minimum mutual induction condition.

A still further object of the present invention is to provide improved logging apparatus in which the subsurface equipment components are disposed in a relationship whereby stray pickup causing false indications of formation conductivity is substantially eliminated.

An additional object of the present invention is to provide an improved method for calibrating a logging device adapted for simultaneously logging the resistivity and conductivity of a borehole.

Another object of the present invention is to provide simple, easily operated, accurately calibrated, logging apparatus for simultaneously measuring and recording the resistivity, conductivity, and natural potential of earth formations traversed by a borehole.

Briefly stated, in accord with the illustrated embodiments of the present invention, there is provided an improved well logging system and apparatus for simultaneously measuring and recording the resistivity, conductivity and natural earth potential of unknown formations adjacent a borehole. The apparatus includes components housed within a longitudinal assembly which, in conjunction with suitable hoisting equipment, is adapted for vertical movement through a borehole. The conductivity logging portion of the apparatus includes a multi-coil arrangement of transmitter and receiver coils combined in a novel relationship adapted to measure the conductivity of a selected earth formation with a high degree of accuracy.

A feature of the present invention is the provision of a novel conductivity calibration coil arrangement including suitable switching means whereby the conductivity measuring portion of the system may be accurately calibrated. The invention also includes novel means to adjust the relative positions of coils of the apparatus to virtually eliminate mutual induction between the coils, thus improving the accuracy of conductivity indications.

Another feature of the invention is the novel disposition of the subsurface components of the apparatus within a subsurface logging tool whereby stray pickup by the receiver portion of the conductivity measuring system is substantially eliminated.

The invention, both as to its organization and method of operation, together with further objects and advantages will best be understood by reference to the following description taken in connection with the accompanying drawings, in which.

Figure 1:
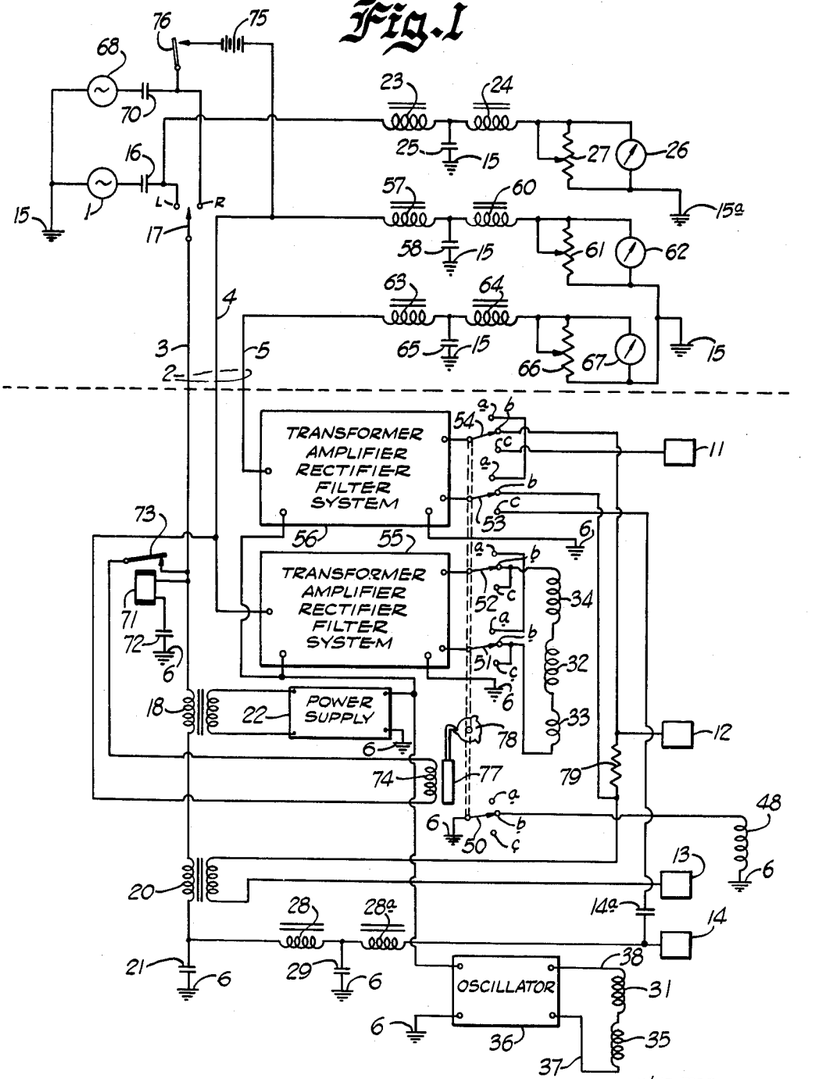
FIG. 1 is a schematic diagram of an electrical system illustrating the operation of the invention.
Figure 2:
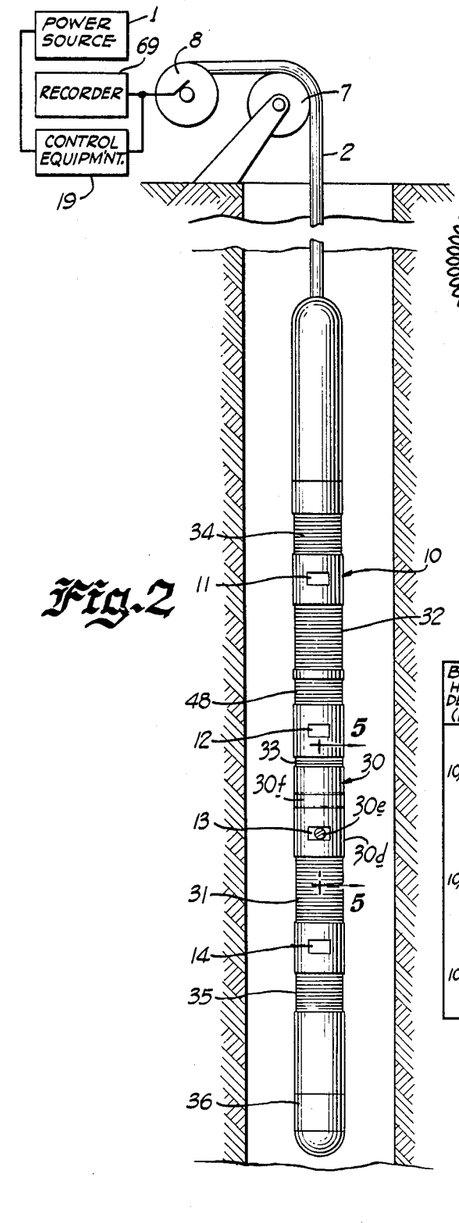
FIG. 2 is a somewhat schematic representation of a subsurface logging tool embodying the present invention together with corresponding surface equipment.

Referring now to the drawings and particularly to FIGS. 1 and 2, there is illustrated an electrical system provided with a power source 1 which preferably consists of a 400 cycle alternating current generator which may be located at the earth's surface adjacent a borehole. The system shown in FIG. 1 in a preferred form may include a cable 2 (see FIG. 2) having three conductors 3, 4, and 5 enclosed by a metallic armor. The armor is not shown in the drawings but it will be understood that it serves as a suitable ground for all equipment in the well bore and the various grounds in the borehole are represented by the reference character 6. The cable is trained over a sheave 7 at the surface of the ground and wound on a reel 8 in the customary manner. Conductor 3, one of the conductors of the cable 2, may be provided with means at its upper end for connecting it to the power source 1. At its lower end, the cable 2 enters a subsurface logging tool 10 containing all the subsurface equipment including four electrodes 11, 12, 13 and 14 which are on the outside of the tool thus making electrical contact with the formations through the borehole fluid. Thus, all of the subsurface equipment is supported on the cable 2 by which it is lowered into the well bore. In FIG. 1, all of the subsurface equipment is shown beneath the broken line while the surface equipment is shown above the broken line.

The 400 cycle source of power 1 supplies a constant current to the equipment in the borehole. One side of power source 1 is grounded at the surface as shown at 15. It is contemplated that two grounds spaced some distance apart will be used for the surface equipment, one of which may be an electrode placed in the slush pit of the well. In FIG. 1 this ground is designated 15a. The circuit for the source 1 is completed through a D.C. blocking condenser 16, a switch 17 when closed to its left contact L, conductor 3, the primaries of transformers 18 and 20, the condenser 21, and back to ground at 6. It will be understood that control equipment 19 in FIG. 2 represents the switch 17 and the other above-surface control equipment.

The transformer 18, through a suitable conventional power supply apparatus 22, supplies power for an oscillator required for the induction portion of the logging tool and for amplifier and rectifier networks employed to transmit the resistivity and conductivity signals to the surface.

The transformer 20, when the 400 cycle current source 1 is in circuit forms a part of means utilizing one or more current electrodes for creating an alternating current electric field in the formation. As shown, the secondary of the transformer 20 is connected to the electrodes 12 and 13 so that 400 cycle alternating current flowing between these electrodes establishes an alternating current electric field in the formation. In the making of a resistivity curve or curves with the arrangement illustrated, both current electrodes 12 and 13 are used. However, as is well known, resistivity curves can be made with only one current electrode in the borehole and the invention is not limited to the particular configuration illustrated.

At the same time the 400 cycle alternating current is impressed on conductor 3, direct current may flow in it to transmit a natural earth potential signal to the surface. To this end a measuring circuit 23, 24, 25, 26, 27 is provided at the surface, one side of which is grounded at 15a, while the other side is connected to conductor 3 and the electrode 14 in the borehole. It will be noted that electrode 14 is connected to the conductor 3 above the D.C. blocking condenser 21. Direct current flowing from electrode 14 to ground electrode 15a is proportional to the spontaneous earth potential or natural earth potential and is independent of the alternating current field established between electrodes 12 and 13. The condenser 14a confines the natural earth potential to the proper circuit. At the surface this D.C. potential is blocked from the circuit of the source 1 by condenser 16.

In the subsurface equipment the alternating current from source 1 is blocked from electrode 14 by a conventional T filter consisting of series chokes 28 and 28a, the common terminals of which are grounded through a condenser 29. This filter also serves to keep alternating current picked up by electrode 14 from the alternating current field established in the formations out of the circuit carrying the direct current natural earth potential signal. The natural or spontaneous earth potential is separated from the alternating current at the surface by a filter consisting of the chokes 23 and 24 and the condenser 25. The spontaneous earth potential is recorded directly by suitable means, such as galvanometer 26 calibrated by potentiometer 27.

For making the resistivity curve, a four electrode system is illustrated, although as indicated above, the invention is not limited to that number or to the configuration shown. The electrodes 12 and 13 are current electrodes. The others, 11 and 14, are potential or probe electrodes. The latter determine or measure the alternating current voltage between their respective locations in the alternating current electric field created by the current flow between electrodes 12 and 13. One resistivity curve may be made using the illustrated preferred arrangement. However, if desired, by the addition of another electrode and an associated rectifying and amplifying channel, it is possible to record an additional resistivity curve based on a different electrode spacing than that associated with the electrodes 11 and 14.

An improved coil system of transmitter and receiver coils used in measuring the conductivity of the formations is coaxially mounted in longitudinally spaced apart relationship on an adjustable mandrel 30 (to be described hereinafter) carried by the subsurface logging tool 10 (see FIG. 2). The mandrel may be fabricated from a suitable insulating material, for example, Bakelite. The system comprises a main transmitter coil 31 for carrying high frequency alternating current creating a field to energize the formations, and a main receiver coil 32 to receive a signal induced by the magnetic field created by the resulting formation currents. In order to reduce mutual induction between coils of the system to a satisfactorily low level, and to reduce the lateral sensitivity of the system to materials relatively near its longitudinal axis, it has been found advantageous to position a compensating receiver coil 33 substantially at the midpoint between main transmitter coil 31 and main receiver coil 32. The coil 33 is electrically connected in series opposition to coil 32 as shown in FIG. 1. As the system thus has reduced lateral sensitivity to materials located relatively near its longitudinal axis, it will receive the desired response from the formations but will receive no response from the zone immediately adjacent its longitudinal axis, that is, the borehole and those portions of the formations immediately adjacent the borehole subject to invasion by borehole fluid.

In order that the system shall accurately measure and record the conductivity of relatively thin beds in the formations, i.e., beds having thicknesses of the order of several times the diameter of the borehole, and to narrow the lateral zone of investigation, it is essential to provide the system with a focusing receiver coil 34 electrically connected in series opposition to main receiver coil 32 and a focusing transmitter coil 35 electrically connected in series opposition to main transmitter coil 31, mounted at appropriate positions relative to the other coils of the system. As shown in FIG. 2, when the subsurface logging tool 10 is in logging position, focusing receiver coil 34 is disposed in the subsurface unit 10 immediately above main receiver coil 32, and focusing transmitter coil 35 is disposed on the subsurface logging tool 10 immediately below main transmitter coil 31. It will be noted that in the arrangement illustrated in FIG. 2, the transmitter coils are mounted in a lower portion of the subsurface unit 10, while all of the receiver coils are mounted above the transmitter coils in an upper portion of the tool. In no case is a transmitter coil placed between two receiver coils, and in no case is a receiver coil disposed between two transmitter coils. This improved and novel arrangement provides means whereby the subsurface logging tool 10 will accurately measure the conductivity of a selected zone in formations which are relatively thin in longitudinal dimension and relatively narrow in lateral dimension, and which are relatively near the longitudinal axis of the borehole, but beyond the zone affected by borehole fluid. The positioning of the transmitter coils one above the other in a lower portion of the tool greatly contributes to elimination of stray pickup by the receiver coils of unwanted signals from the transmitter coils and their lead wires, all as discussed more fully below.

In the coil system illustrated in FIG. 2, the coils are preferably of the same diameter, with the main transmitter and main receiver coils spaced approximately forty inches apart. This spacing is based on the thickness of the thinnest strata to be explored. As stated above, the compensating receiver coil 33 is advantageously positioned at about the midpoint of the coil system between main transmitter coil 31 and main receiver coil 32 (see FIG. 2). Focusing receiver coil 34 and focusing transmitter coil 35, respectively, located above and below the main coils, are preferably symmetrically spaced about compensating receiver coil 33. The main transmitter and receiver coils may contain between 50 and 100 turns each while the focusing coils may each contain about ⅗ the number of turns in the main coils. Compensating receiver coil 33 may contain 10% of the number of turns in each of the main transmitter and receiver coils.

A conventional high frequency oscillator 36 which is connected to power supply 22, is provided to supply high frequency current to the transmitter coils 31 and 35. Oscillator 36 may advantageously have an oscillation frequency of 20 kilocycles per second.

In view of the very small voltage of the signal which is measured in the receiver coils as a result of current flow through the formations (in many cases, only a fraction of a millivolt), it is essential for meaningful formation conductivity curves that the voltage measurement be completely accurate. This is not possible if unwanted signals caused by stray pickup are received by the receiver coils in addition to the wanted signal from the formations. Due to the strong magnetic field created by the current flowing through the lead wires extending from the oscillator to the transmitter coils which constitute a source for stray pickup, it is necessary to ensure that the receiver coils do not pick up unwanted signals from these lead wires. The novel oscillator disposition illustrated in FIGURE 2 has been devised, and has been found by test to eliminate substantially all stray pickup by the receiver coils from transmitter coil lead wires. As shown, the oscillator 36 is disposed in the logging tool below focusing transmitter coil 35. Lead wires 37 and 38 designated only in FIG. 1, are physically located between the oscillator 36 and the transmitter coils 31 and 35 as shown in FIG. 2 and carry high frequency current from the oscillator to the transmitter coils. Thus, since the oscillator 36 is disposed at the lower extremity of the logging tool and the transmitter coils 31 and 35 are disposed next above the oscillator 36, the lead wires 37 and 38 extending between them can be relatively short and located relatively remote from the receiver coils 32, 33 and 34. Accordingly, it is possible through this arrangement to isolate as effectively as possible those components carrying high frequency current, such as the transmitter coils and their lead wires, from the receiver coils. As a result of this unique arrangement of components, stray pickup by receiver coils of unwanted signals resulting from high frequency current flowing in the transmitter coils and their lead wires is substantially eliminated in the induction logging system of this invention.

While the positioning of compensating receiver coil 33 between the main transmitter and receiver coils substantially reduces the mutual induction of the system to a relatively low level as explained above, it is virtually impossible to eliminate all mutual induction because of variations in the individual coils, their relative positions and the effect of other components of the system. To substantally eliminate mutual induction between the coils of the system, it has been found advantageous to provide the system with means for adjustment whereby the transmitter coil group may be physically moved relative to the receiver coil group. This adjustment means, illustrated in detail in FIGURE 5, consists of an adjustable mandrel 30 having a receiver coil mandrel portion 30a and a lower portion 30b of reduced diameter which slides telescopically into a coaxial mating cavity 30c in the upper portion of transmitter coil mandrel portion 30d. It will be understood that internal wiring and certain other components of the logging tool, not here of interest, are omitted from FIG. 5 for clarity.

Figure 5:
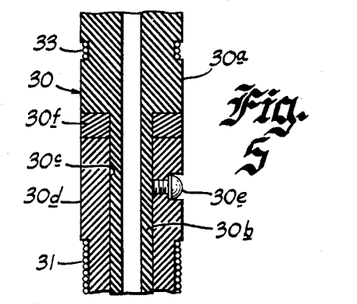
FIG. 5 is an enlarged fragmentary sectional view of the logging tool of FIG. 2 taken along the line 5—5 of FIG. 2.

Transmitter coil mandrel portion 30d carries a set screw 30e which may be tightened against the portion 30b of reduced diameter to locate the transmitter coil group in an adjustable but fixed position relative to the receiver coil group. The operation of the adjustment means is performed with the tool 10 removed from the borehole and consists of initially loosening the set screw 30e so that it will not interfere with relative movement of the receiver and transmitter coil mandrels carrying the coil system. A fixed signal is then established by passing high frequency current through the transmitter coils while the tool is suspended in a medium of zero conductivity as in open air. Any mutual induction between the coils of the system not balanced out by compensating receiver coil 33 and the focusing coils will then be indicated on a galvanometer connected to receive an amplified and rectified signal from the receiver coils. The position of the transmitter coil group is then varied relative to the receiver coil group by manually adjusting the relative positions of the coil mandrel portions until a coil spacing is obtained corresponding to a minimum condition of mutual induction between the coils. The set screw 30e is then tightened, and the coil spacing relationship corresponding to minimum mutual induction of the coils is established. If desirable, a spacer 30f of fiber or other suitable material may be placed in the groove at the juncture between receiver and transmitter coil mandrel portion as indicated in FIGS. 2 and 5.

While there has been shown and described structure for adjusting the longitudinal spacing of the transmitter coil group relative to the receiver coil group to substantially eliminate mutual induction between the transmitter coils and the receiver coils, it will be understood that the physical position of other coils in the group could be similarly adjusted, individually or in combination, to accomplish similar results.

Figure 3:
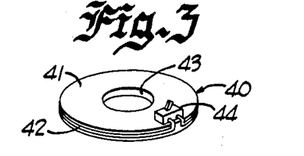
FIG. 3 is a perspective view of a coil device used in calibrating the measuring system.
Figure 4:
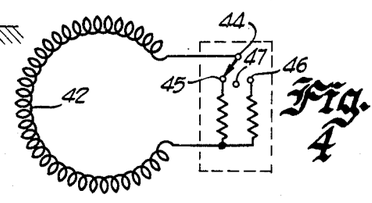
FIG. 4 is a schematic diagram showing the electrical system for the device of FIG. 3.

The system is provided with an external standard coil 40 of known conductivity in order to calibrate the instrument so that the surface recorder will correctly reflect the conductivity of earth formations under investigation (see FIG. 3). External standard coil 40 is not attached to the logging tool 10 but is used in conjunction with it above the surface of the ground. The external standard coil 40 comprises a disc-like framework of wood or other suitable insulating material 41 which carries a wire coil 42 on its outer periphery. The center portion of the frame is provided with an opening 43 of a size which permits the external standard coil 40 to slide readily over the exterior of the logging tool 10. The external standard coil 40 is provided with a three-position toggle switch 44 having a pole which may be operated to engage a first contact 45 (FIG. 4) to include a resistor providing a circuit of known conductivity, for example, equal to 1,000 millimhos, or to engage a second contact 46 to include a resistor providing a circuit of a different known conductivity, for example, one of 2,000 millimhos. In addition, the switch 44 has an off contact 47. The contacts 45, 46 and 47 and the resistors which are selectively included in the standard coil circuit are disposed within the housing for toggle switch 44. The external conductivity standard coil is operated to calibrate a logging tool which is suspended in a medium of zero conductivity as in open air. Standard coil 40 is slipped over the logging tool 10 to encircle it substantially at the midpoint of the coil system. The pole of the toggle switch may then be moved into engagement with contact 45 to provide a closed circuit having a conductivity of 1,000 millimhos. A fixed signal is then established by passing high frequency current through the transmitter coils which induces a current in standard coil 40 surrounding the tool, and this current in turn induces a voltage signal which is picked up by the receiver coils, amplified and transmitted to the surface system as a direct current signal by means later described, where it causes a galvanometer to indicate the conductivity of the external standard coil. The galvanometer may then be adjusted by a potentiometer until it registers the conductivity of the standard, for example, 1,000 millimhos. In order to check this calibration, the pole of switch 44 may then be engaged with contact 46 to provide a closed circuit having a different known conductivity, for example 2,000 millimhos. After these adjustments, the conductivity measuring system of the logging tool is accurately calibrated, external standard coil 40 is removed, and the tool is ready to be lowered into a borehole for a logging operation.

The system is also provided with a calibration coil 48 consisting of an accurately constructed standard coil of known conductivity which is coaxially mounted on the logging tool 10 immediately below the main receiver coil 32 (see FIG. 2). This calibration coil 48 which may conveniently have a conductivity of 1,000 millimhos, is carried into the bore hole during logging operations. Coil 48 is included in a circuit connected to ground and this circuit is provided with a suitable switch 50 (described below) which may be operated from the surface to open or close the circuit that it controls. When the logging tool 10 is in logging position in a borehole and current is induced in the formation by means of the transmitter coils, a galvanometer forming part of a system arranged to measure conductivity will indicate only the conductivity of the formation under investigation with the switch 50 in an open circuit position, but will read the sum of the unknown conductivity of the formation and the known conductivity of the calibration coil 48 when the switch 50 closes the circuit including calibration coil 48. It is obvious that if the conductivity measuring system is properly calibrated the indicated conductivity should increase by 1,000 millimhos (or the value of coil 48) when switch 50 is operated to close its circuit. Any calibration adjustment indicated to be required for operation may then be accomplished by potentiometer settings.

Associated with the electrodes and coils in the borehole are five single pole, multiple throw switches designated 50, 51, 52, 53 and 54. All are actuated in unison, each having three contacts designated a, b, and c. The alternating current voltage across probe electrodes 11 and 14 passes through switches 53 and 54 when their blades engage respective contacts c, and the system causes a direct current signal responsive to variations in the alternating current voltage to be transmitted to the surface over conductor 5 of the cable at a level sufficiently high to be measured. Simultaneously while the switches 53 and 54 engage contacts c to transmit a signal from probe electrodes 11 and 14, switches 51 and 52 also engage contacts c so that the system causes a direct current signal responsive to the A.C. voltage induced in the receiver coils 32, 33 and 34 by the formation currents induced by the transmitter coils to be transmitted to the surface through conductor 4 of the cable. These signals are transmitted simultaneously. They are independent from each other and independent from the natural potential signal which may be transmitted over conductor 3 at the same time. As switch 50 operates in unison with switches 51, 52, 53 and 54, its blade will also engage its contact c at this time. At this contact c is an open circuit position only the conductivity of the formation under investigation is measured.

Each pair of switches has its own system for amplifying, rectifying and transmitting a signal to the conductor of the cable with which it is associated. The blades of switches 51 and 52 are connected to the terminals of a combination transformer, amplifier, rectifier, and filter system designated by reference character 55 of conventional design which may be substantially the same as that shown in my Patent 2,617,852 covering Electrical Well Logging System, issued November 11, 1952. Within the system 55 the voltage is stepped up and fed by the secondary of the transformer into a voltage and power amplifier (not shown). The output of the amplifier is connected to the primary of a transformer within system 55, the secondary of which is connected to a full wave rectifier which impresses the signal, now D.C., onto the conductor 4 through a filter part of combination system 55 which includes a condenser, load resistor, and a choke coil.

Likewise, the blades of switches 53 and 54 are connected to a system 56 similar to system 55 which includes an input transformer of an amplifier connected to feed an output transformer. The secondary of the output transformer, not shown, is connected in circuit with a rectifier to impress a D.C. signal onto the conductor 5 through a filter part of system 56 which filter part includes a load resistor, a condenser, and a choke coil.

Figure 6:
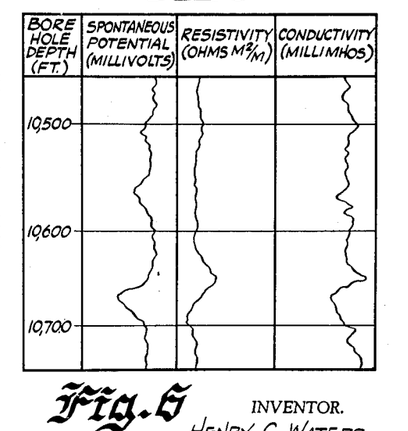
FIG. 6 is a fragmentary portion of a graph or log illustrating curves representing the characteristics of earth formations surrounding a borehole such as might be made with the apparatus of FIG. 2.

At the surface, the signal appearing upon the conductor 4 is fed to a circuit which includes a potentiometer 61, a galvanometer 62 and a filter consisting of a choke 57, a condenser 58 and a choke 60. Likewise the signal transmitted by conductor 5 is fed to a circuit which includes a potentiometer 66, a galvanometer 67, a filter consisting of chokes 63 and 64, and a condenser 65. These measuring circuits like that for the natural potential signal, are, of course, of the recording type, and all three are adapted to develop curves simultaneously upon a suitable recording medium driven in synchronism with the sheave 8 so that all curves appear side by side as shown in FIG. 6 and are correlated with respect to depth within the borehole. All of these recording type measuring circuits are represented by recorder 69 in FIG. 2.

Because of the considerable amount of mutual induction and capacity of conductors in the cable, a certain amount of the alternating current voltage on the conductor 3 will be coupled to conductors 4 and 5 by means of capacity and induction. In order to separate the D.C. signals from the undesirable A.C. voltages the filter sections are necessary. The D.C. signals transmitted over conductors 3, 4, and 5, of course, may be calibrated by means of potentiometers 27, 61 and 66.

A source of 60 cycle current and a source of direct current are employed in operating the switches in the system and these are connected in circuit with two of the conductors of the cable, conductors 3 and 4 being used in the circuit in FIG. 1 of the drawings. The condensers 16 and 21 associated with conductor 3, as well as other elements of the circuit may have such characteristics as to pass 400 cycle current but not 60 cycle current or direct current. While switching over, relay or control circuits may be employed which pass 60 cycle current but not 400 cycle current.

A solenoid step-by-step switch located within the subsurface logging tool 10 may be used to switch by remote control from the surface. For switching over, switch 17 is placed in its right hand position. This connects a 60 cycle source of power 68 to conductor 3 through a D.C. blocking condenser 70. A 60 cycle relay 71 in the borehole is thus energized being then in circuit through condenser 72. With relay 71 energized, contact 73 is closed and solenoid 74 is connected directly across conductors 3 and 4. With the solenoid 74 connected across conductors 3 and 4, a D.C. switching voltage from a battery 75 is placed across conductors 3 and 4 momentarily by means of switch 76. The switch 76 is then released. Each time this D.C. switching voltage is applied by closing switch 76 the various switches 50, 51, 52, 53, and 54 are advanced one step in synchronism, the solenoid 73 each time actuating an armature 77 to turn a ratchet wheel 78 one-third turn. The wheel 78 is mechanically connected to the blades of the switches 50, 51, 52, 53 and 54 as diagrammatically illustrated by the dashed lines of the drawing. The use of direct current for switching is only possible because two conductors are being used and the net magnetizing effect of the D.C. is zero. The system would be inoperative if only one conductor were used for this direct current because the equipment would become highly magnetized and there would result magnetic "noises" and disturbances of a very undesirable nature from a commercial standpoint. With the switches 50, 51, 52, 53 and 54 in position a, the primaries of the transformers of systems 55 and 56 are shorted. That is, both the resistivity and the conductivity signal channels are shorted, and there is a zero signal input to these channels, so that the galvanometers 62 and 67 can be set at their zero reference line. With the switches in position b, a calibration signal which is equal to the sum of the conductivities of the unknown formation adjacent the coil system and the known conductivity of the standard coil 48 may be placed on the conductivity signal channel. Also, with the switch in b position a calibration signal which simulates or represents a definite value of formation resistivity is placed on the resistivity signal channel by means of the voltage drop across a resistor 79. The galvanometer 67 can then be calibrated as desired by means of the potentiometer 66.

By switching to position c, switch 50 is operated to open the circuit to calibration coil 48 and a signal which indicates only the conductivity of the formation under investigation is placed on the conductivity signal channel. The galvanometer 62 may then be calibrated by means of the potentiometer 61 based on the change in the indicated conductivity obtained by reducing the actual conductivity by the known amount represented by calibration coil 48.

Turning now to a brief description of the operation of the apparatus and system embodying the present invention, it will be assumed that the logging tool 10 is at the borehole above the surface of the ground. It will also be assumed that the spacing of the coils used in the conductivity measuring portion of the system has been adjusted to achieve a minimum condition of mutual induction using the arrangement illustrated in FIG. 5. The operator initially suspends the logging tool 10 in the air, remote from any conductive material. The external standard coil 40 is placed around the tool 10, and switch 44 is closed to contact 45, thus completing a coil circuit of known conductivity equal to 1,000 millimhos. A current is then induced in the standard coil 40 from high frequency current in the transmitter coils to induce a signal in the receiver coils proportional to the conductivity of the standard coil 40. The signal is indicated on galvanometer 62 which may then be calibrated by potentiometer 61. With switch 44 operated to engage contact 46 a coil circuit of a different known conductivity is completed and galvanometer 62 will now read its value, 2,000 millimhos. This provides an additional verification that no damage has occurred to either the standard coil or the measuring system to cause possible inaccurate indication of conductivity.

Thereafter, standard coil 40 is removed and logging tool 10 is lowered into the borehole, where it may be further calibrated through the galvanometer zero reference settings described. After an indication of the conductivity of the formation under investigation is obtained by operating switch 50 into the c position as described, the switches 50, 51, 52, 53 and 54 are operated into the b position. In the b position, as explained, switches 53 and 54 have a known definite value of formation resistivity across their terminals consisting of resistor 79. At the same time, galvanometer 62 is receiving a conductivity indication consisting of the sum of the unknown conductivity of the formation and the known conductivity of calibration coil 48. The galvanometers 62 and 67 may then be calibrated as desired by means of potentiometers 61 and 66. The switches 50, 51, 52, 53 and 54 are then operated into the c position and the logging tool is connected to carry out the logging operation. The logging tool is then moved through the unknown formations traversed by the borehole, and the recorder 69 at the surface operates to produce a single chart including curves of the natural earth potential, conductivity, and resistivity of the formations, all correlated with the depths in the borehole at which the measurements are made. A section of a typical chart thus produced is shown in FIG. 6.

It will be obvious to those skilled in the art that the described apparatus provides an improved well logging system and apparatus for simultaneously measuring and recording the resistivity, conductivity, and natural earth potential of unknown formations with a high degree of accuracy because of the measuring system calibration means, and the means for the elimination of unwanted signals due to stray pickup and mutual induction. Specifically, the present invention is an improvement over that disclosed and claimed in my United States Letters Patent 2,617,852 for Electrical Well Logging System, issued November 11, 1952.

Although the illustrated embodiment describes a three conductor system, it will be obvious that through the use of a cable having more than three conductors, additional signals of other indications can be transmitted. Therefore, the expression "a cable having three conductors" as used through this specification and the appended claims is not to be taken as a limitation to three conductors only, but it is to be understood that this invention also includes systems employing cables having other than three conductors.

While there has been described what is at present considered to be the preferred embodiment of the invention, it will be understood that various other modifications may be made therein and are intended to be included within the scope of the appended claims.

I claim:

1. In apparatus for logging earth formations traversed by a borehole, the combination comprising: means for electrically energizing earth formations including a source of alternating current; a subsurface unit containing equipment for logging a borehole; means to support and vertically move said unit within a borehole during a logging operation therein including a cable attached to said unit, said cable having at least three electrical conductors; means for connecting said alternating current source to one of said conductors; means to measure and record the natural potential of earth formations; means to measure and record the resistivity of earth formations including at least one potential electrode, an amplifier, and a rectifier carried by said unit; means to measure and record the conductivity of earth formations including a transmitter coil carried on said unit, a high frequency oscillator for supplying current to said transmitter coil mounted on said unit below said transmitter coil when said unit is disposed in logging position, means to energize said oscillator from said current source, lead wires carrying current between said oscillator and said transmitter coil extending downwardly from said transmitter coil to said oscillator, and a receiver coil carried on said unit longitudinally spaced apart from and above said transmitter coil when said unit is disposed in logging position in a borehole, the disposition of said oscillator below said transmitter coil and said transmitter coil between said oscillator and said receiver coil, enabling the lead wires from said oscillator to reach said transmitter coil without closely approaching said receiver coil, whereby stray pickup by said receiver coil of unwanted signals from said lead wires is substantially eliminated; means to achieve a minimum condition of mutual induction between said transmitter coil and said receiver coil including a compensating coil coaxially mounted between them and connected in series opposition to said receiver coil, a mandrel for supporting said coils in coaxial relationship, said mandrel being adjustable in length after said coils are mounted thereon, whereby the spacing between said coils may be adjusted to establish a coil spacing corresponding to a minimum condition of mutual induction, and means to secure the length of said mandrel, whereby the coils may be carried on said mandrel in a spaced apart relationship corresponding to a minimum condition of mutual induction; and means to calibrate said conductivity measuring and recording system comprising a calibration coil circuit, said calibration coil circuit including a coil of known conductivity subject to the influence of current flow in said transmitter coil carried by said subsurface unit, a switch in said calibration coil circuit operable from the surface of the earth into open circuit or closed circuit condition, and means to operate said switch from the surface of the earth whereby when said switch is operated into closed circuit condition a signal may be received at the earth's surface reflecting the sum of the conductivities of an unknown formation and the calibration coil circuit, and when said switch is operated into open circuit condition a signal may be received at the earth's surface which reflects only the conductivity of an unknown formation.

2. In apparatus for logging earth formations traversed by a borehole, the combination comprising: means for electrically energizing earth formations including a source of alternating current; a subsurface unit containing equipment for logging a borehole; means to support and vertically move said unit within a borehole during a logging operation therein including a cable attached to said unit, said cable including electrical conductor means; means to measure and record the natural potential of earth formations; a first system to measure and record the resistivity of earth formations; a second system to measure and record the conductivity of earth formations including a transmitter coil carried on said unit, an oscillator for supplying current of frequency higher than said source frequency to said transmitter coil mounted on said unit below said transmitter coil when said unit is disposed in logging position, means to energize said oscillator from said current source, current carrying lead wires extending downwardly from said transmitter coil to said oscillator, and a receiver coil carried on said unit longitudinally spaced apart from and above said transmitter coil when said unit is disposed in logging position in a borehole, the disposition of said oscillator below said transmitter coil and said transmitter coil between said oscillator and said receiver coil substantially preventing stray pickup by said receiver coil of unwanted signals; a coil circuit of known conductivity surrounding said unit, said coil circuit including a switch; means to achieve a minimum condition of mutual induction between said transmitter coil and said receiver coil including a compensating coil coaxially mounted between them and connected in series opposition to said receiver coil, a mandrel for supporting said coils in coaxial relationship, said mandrel being adjustable in length, whereby the spacing between said coils may be established at a coil spacing corresponding to a minimum condition of mutual induction; and means to calibrate said first and said second measuring and recording systems including means whereby said systems may respectively be shorted, means whereby a known alternating current voltage may be impressed upon the input of said first measuring and recording system, and means whereby the switch in said coil circuit of known conductivity may be placed in closed circuit position to affect the input of said second measuring and recording system.

3. In apparatus for logging the conductivity of earth formations traversed by a borehole, the combination comprising: a cable having at least one conductor; a subsurface logging tool supported on said cable to be lowered into a well bore thereby; a source of alternating current together with means for connecting it to said cable conductor whereby alternating current may be transmitted through the cable; a transmitter coil carried on said tool; means to circulate alternating current of frequency other than said current source frequency in said transmitter coil, including an oscillator energized by means connected to said current source; a receiver coil carried on said logging tool in coaxial longitudinally spaced apart relation with said transmitter coil, said receiver coil detecting a signal indicative of conductivity from earth formations carrying a current induced therein by said transmitter coil; and means for substantially eliminating mutual induction between said transmitter coil and said receiver coil comprising a compensating coil of substantially fewer turns than said receiver coil electrically connected in series opposition to said receiver coil and coaxially carried on said logging tool substantially at the midpoint of the space between said transmitter and receiver coils, means for adjusting the spacing between the transmitter coil and the receiver coil to achieve a minimum condition of mutual induction including a telescoping mandrel on which all of said coils are mounted carried by said logging tool, and means associated with said mandrel to secure said transmitter coil and said receiver coil in a selected spaced apart relationship.

4. In apparatus for logging the conductivity of earth formations traversed by a borehole, the combination comprising: a cable having at least one conductor; a subsurface logging tool supported on said cable to be lowered into a well bore thereby; a source of alternating current; a transmitter coil mounted on said logging tool; means to circulate alternating current of frequency substantially higher than said source frequency in said transmitter coil including an oscillator coaxially mounted on said logging tool below said transmitter coil when said tool is in logging position in a borehole, said oscillator being energized through means connected to said source; a circuit comprising lead wires carrying high frequency alternating current from said oscillator to said transmitter coil, said lead wires extending downwardly from said transmitter coil to said oscillator; a receiver coil adapted to detect a signal from earth formations representative of their conductivity on current flow in said formation induced therein by said transmitter coil, said receiver coil being coaxially mounted on said logging tool spaced relatively remote from and above said transmitter coil; means to transmit a signal related to the signal detected by said receiver coil to the earth's surface; and means including a circuit at the surface of the earth for recording a signal representative of earth formation conductivity, the recorded signal indicating the formation conductivity with substantial accuracy because of the disposition of said oscillator and said lead wires relative to said transmitter coil ensuring that current in said transmitter coil and its leads will have negligible influence on said receiver coil whereby said receiver coil will not detect any substantial unwanted signal due to stray pickup.

5. In apparatus for logging earth formations traversed by a borehole, the combination comprising: means for energizing earth formations including a source of alternating current; a subsurface logging tool; means to support and vertically move said tool within a bore hole during a logging operation therein including a cable attached to said tool, said cable having at least three electrical conductors; means for connecting said alternating current source to one of said conductors; at least one current electrode supported on said logging tool; means utilizing said current electrode for creating an alternating field in a formation adjacent the borehole; at least one probe electrode supported on said logging tool for determining alternating current voltage at a point in the field so created; a transmitter coil on said logging tool; means to circulate a high frequency current through said transmitter coil including an oscillator connected to said energizing means; a receiver coil carried on said logging tool in coaxial longitudinally spaced apart relationship with said transmitter coil, said receiver coil being adapted to detect an alternating current voltage signal proportional to the conductivity of earth formations carrying current induced therein by high frequency current circulating in said transmitter coil; a coil circuit of known conductivity encircling said tool, said coil circuit including a switch; a first system and a second system for amplifying and rectifying alternating current voltages and separately impressing the resultant direct current signal voltages upon the other two conductors of the cable; a switching system operable by manipulations at the earth's surface for respectively connecting said electrode and said receiver coil to the respective amplifying and rectifying systems; and circuits at the surface of the earth for recording the direct current signal voltages, said switching system including for purposes of calibration of said recording circuits means whereby said amplifying and rectifying systems may respectively be shorted, means whereby a known alternating current voltage may be impressed upon the input of said first amplifying and rectifying system, and means whereby the switch in said coil circuit of known conductivity may be placed in closed circuit position to affect the input of said second amplifying and rectifying system.

6. In apparatus for logging earth formations traversed by a borehole, the combination comprising: means for energizing earth formations including a source of alternating current; a cable having at least three conductors; a subsurface logging tool supported on said cable to be lowered into a well bore thereby; means for connecting the source of alternating current to one of said conductors whereby alternating current may be transmitted through the cable; means for creating an alternating current field in a formation adjacent the well bore including at least one current electrode carried on said logging tool; at least one electrode supported on said logging tool for determining the alternating current voltage at a point in the field so created; a system for amplifying and rectifying the alternating current voltage measured at a point in the created field and for impressing the resulting direct current signal voltage upon one of the other two conductors of the cable; electrical circuit means to indicate the resultant direct current signal at the surface of the earth; a transmitter coil for inducing current flow in earth formations supported on said logging tool; an oscillator for supplying high frequency current to said transmitter coil; means to energize said oscillator from said current source, a receiver coil for receiving a signal from earth formations proportional to their conductivity on current flow through the formations carried on said logging tool in coaxial relation with said transmitting coil; a system for amplifying and rectifying the alternating current signal detected by said receiver coil; electrical circuit means to indicate the amplified and rectified receiver coil signal at the surface of the earth; a calibration coil of known conductivity carried on said logging tool between said transmitter and receiver coils in coaxial relation therewith; an electrical circuit including said calibration coil encircling said logging tool connected to ground; and a switch in said last mentioned circuit operable to open circuit and closed circuit position by manipulations from the surface of the ground whereby a signal related to a known conductivity may be detected by said receiver coil when said switch is in closed circuit condition but will not be detected when said switch is in open circuit condition facilitating calibration of said receiver coil signal indicating circuit from the surface of the earth.

7. In apparatus for logging earth formations traversed by a borehole, the combination comprising: means for electrically energizing earth formations including a source of alternating current; a subsurface unit containing equipment for logging a bore hole; means to support and vertically move said unit within a bore hole during a logging operation therein including a cable attached to said unit, said cable having at least three electrical conductors; means for connecting said alternating current source to one of said conductors; means including an electrode carried by said subsurface unit to measure and record the natural potential of earth formations; means to measure and record the resistivity of earth formations including at least one potential electrode, an amplifier, and a rectifier carried by said unit; and means to measure and record the conductivity of earth formations including a transmitter coil carried on said unit for inducing current flow in earth formations, an oscillator for supplying high frequency current to said transmitter coil mounted on said unit below said transmitter coil when said unit is disposed in logging position, means to energize said oscillator from said current source, lead wires extending between said oscillator and said transmitter coil, and a receiver coil for receiving a signal from earth formations proportional to their conductivity carried on said unit relatively remote from said oscillator and longitudinally spaced apart from and coaxially above said transmitter coil when said unit is disposed in logging position in a bore hole, the disposition of said oscillator below said transmitter coil and remote from said receiver coil enabling high frequency current from said oscillator to reach said transmitter coil without closely approaching said receiver coil whereby stray pickup by said receiver coil of unwanted signals is substantially eliminated.

8. In apparatus for logging earth formations traversed by a borehole, the combination comprising: means for electrically energizing earth formations including a source of alternating current; a subsurface unit containing equipment for logging a borehole; means to support and vertically move said unit within a borehole during a logging operation therein including a cable attached to said unit, said cable having at least three electrical conductors; means for connecting said alternating current source to one of said conductors; means including an electrode carried by said subsurface unit to measure and record the natural potential of earth formations; means to measure and record the resistivity of earth formations including at least one potential electrode, an amplifier, and a rectifier carried by said unit; means to measure and record the conductivity of earth formations including a transmitter coil for inducing current flow in earth formations on high frequency current flow through the transmitter coil carried on said unit, a high frequency oscillator for supplying current to said transmitter coil mounted on said unit below said transmitter coil when said unit is disposed in logging position, means to energize said oscillator from said current source, lead wires extending between said oscillator and said transmitter coil, and a receiver coil for receiving a signal from earth formations proportional to their conductivity coaxially carried on said unit longitudinally spaced apart from and above said transmitter coil when said unit is disposed in logging position in a borehole; means to achieve a minimum condition of mutual induction between said transmitter coil and said receiver coil including a compensating coil coaxially mounted between them and connected in series opposition to said receiver coil, a mandrel for supporting said coils in coaxial relationship, said mandrel being adjustable in length after said coils are mounted thereon, whereby the spacing between said coils may be adjusted to establish a coil spacing corresponding to a minimum condition of mutual induction and means to secure the length of said mandrel, whereby the coils may be carried on said mandrel in a fixed spaced apart relationship corresponding to a minimum condition of mutual induction.

9. A simultaneous induction, resistivity, and natural earth potential well logging system, comprising, in combination: means for electrically energizing earth formations including a source of alternating current; a subsurface unit containing equipment for logging a borehole; means to support and vertically move said unit within a borehole during a logging operation therein including a cable attached to said unit, said cable including electrical conductor means; means including an electrode carried by said subsurface unit to measure the natural potential of earth formations and to transmit a signal representative thereof to the earth's surface; means to measure the resistivity of earth formations and to transmit a signal representative thereof to the earth's surface; means to measure the conductivity of earth formations including a transmitter coil carried by said unit for inducing current flow in earth formations, an oscillator for supplying current of frequency higher than said source frequency to said transmitter coil, means to energize said oscillator from said current source, a receiver coil carried by said unit in coaxial relation to said transmitter coil for receiving a signal from earth formations proportional to their conductivity on current flow induced therein by said transmitter coil, and means for preventing stray pickup by said receiver coil of unwanted signals, including the disposition of said oscillator at the lower extremity of the unit and said transmitter coil between it and said receiver coil; means for transmitting a signal representative of formation conductivity from said receiver coil to the surface of the earth; and means for recording said resistivity, said conductivity, and said natural earth potential signals on a common record medium to provide continuous correlated indications of the magnitudes thereof.

10. A simultaneous induction, resistivity, and natural earth potential well logging system, comprising, in combination: means for electrically energizing earth formations including a source of alternating current; a subsurface unit containing equipment for logging a borehole; means to support and vertically move said unit within a borehole during a logging operation therein including a cable attached to said unit, said cable including electrical conductor means; means including an electrode carried by said subsurface unit to measure the natural potential of earth formations and to transmit a signal representative thereof to the earth's surface; means to measure the resistivity of earth formations and to transmit a signal representative thereof to the earth's surface; means to measure the conductivity of earth formations including a transmitter coil carried by said unit for inducing current flow in earth formations, an oscillator for supplying current of frequency higher than said source frequency to said transmitter coil, means to energize said oscillator from said current source, a receiver coil carried by said unit in coaxial relation to said transmitter coil for receiving a signal from earth formations proportional to their conductivity on current flow induced therein by said transmitter coil, and means for substantially eliminating mutual induction between said transmitter coil and said receiver coil including a compensating coil of fewer turns than said receiver coil electrically connected in series opposition to said receiver coil coaxially carried on said logging tool between said transmitter coil and said receiver coil, and mean for adjusting the spacing between said transmitter coil and said receiver coil to achieve a minimum condition of mutual induction including an adjustable length mandrel for mounting said coils carried by said logging tool; means for transmitting a signal representative of formation conductivity from said receiver coil to the surface of the earth; and means for recording said resistivity, said conductivity, and said natural earth potential signals on a common record medium to provide continuous correlated indications of the magnitude thereof.

11. A simultaneous induction, resistivity, and natural earth potential well logging system, comprising, in combination: means for electrically energizing earth formations including a source of alternating current; a subsurface unit containing equipment for logging a borehole; means to support and vertically move said unit within a borehole during a logging operation therein including a cable attached to said unit, said cable including electrical conductor means; means including an electrode carried by said subsurface unit to measure the natural potential of earth formations and to transmit a signal representative thereof to the earth's surface; a first system to measure the resistivity of earth formations and to transmit a signal representative thereof to the earth's surface; a second system to measure the conductivity of earth formations including a transmitter coil carried by said unit for inducing current flow in earth formations, an oscillator for supplying current of frequency higher than said source frequency to said transmitter coil, means to energize said oscillator from said current source, a receiver coil carried by said unit in coaxial relation to said transmitter coil for receiving a signal from earth formations proportional to their conductivity on current flow induced therein by said transmitter coil; means to transmit a signal representative of formation conductivity from said receiver coil to the earth's surface; a coil circuit of known conductivity surrounding said unit, said coil circuit including a switch; and means to calibrate said first and said second measuring systems including means whereby said systems may respectively be shorted, means whereby a known alternating current voltage may be impressed upon the input of said first measuring system, and means whereby the switch in said coil circuit of known conductivity may be placed in closed circuit position to affect the input of said second measuring system; and means for recording said resistivity, said conductivity, and said natural earth potential signals on a common record medium to provide continuous correlated indications of the magnitudes thereof.

12. In induction well logging apparatus the combination comprising: means for energizing earth formations including a source of alternating current; a subsurface unit for logging a borehole; means to support said unit within a borehole including a cable attached to said unit, said cable including electrical conductor means; a system for measuring a signal proportional to formation conductivity including a transmitter coil carried by said unit for inducing current flow in earth formations, a focusing transmitter coil connected in series opposition to said transmitter coil and mounted on said unit below and in spaced coaxial relation with said transmitter coil when said unit is in logging position, an oscillator connected to said source for supplying current of frequency higher than said source frequency to said transmitter coils, a main receiver coil carried by said unit spaced apart from and above said transmitter coil when said unit is in logging position for receiving a signal from earth formations proportional to their conductivity on current flow induced therein by said transmitter coils, a compensating receiver coil connected in series opposition to said main receiver coil mounted on said unit spaced from and between said transmitter coil and said receiver coil, a focusing receiver coil connected in series opposition to said main receiver coil and mounted spaced above it on said unit, all of said receiver coils and said transmitter coils being mounted in coaxial relation with each other, the inter-relationship of said transmitter and receiver coils providing means to measure the conductivity of a selected relatively thin, narrow formation zone relatively near the longitudinal axis of the borehole but beyond the zone affected by borehole fluid, means for preventing stray pickup by said receiver coils of unwanted signals, including the disposition of said oscillator at the lower extremity of the unit during logging operations and the disposition of said transmitter coils between the oscillator and said receiver coils, means for transmitting a signal representative of the conductivity of said selected formation zone from said receiver coils to the surface of the earth; and means to record said conductivity signal on a record medium at the earth's surface.

13. In apparatus defined by claim 12, means for substantially eliminating mutual induction between said receiver coils and said transmitter coils including means for adjusting the spacing between said transmitter coils and said receiver coils to achieve a minimum condition of mutual induction comprising an adjustable length mandrel carried by said unit.

14. In apparatus defined by claim 12, means to calibrate said measuring system including a coil circuit simulating a formation of known conductivity carried by said unit in coaxial relationship with its longitudinal axis, and a switch in said coil circuit operable between open circuit and closed circuit positions from the earth's surface.

15. A simultaneous induction, resistivity, and natural earth potential well logging system, comprising, in combination: means for electrically energizing earth formations including a source of alternating current; a subsurface unit containing equipment for logging a borehole; means to support and vertically move said unit within a borehole during a logging operation therein including a cable attached to said unit, said cable including electrical conductor means; means including an electrode carried by said subsurface unit to measure the natural potential of earth formations and to transmit a signal representative thereof to the earth's surface; a first system to measure the resistivity of earth formations and to transmit a signal representative thereof to the earth's surface; a second system to measure the conductivity of earth formations including a transmitter coil carried by said unit for inducing current flow in earth formations, an oscillator for supplying current of frequency higher than said source frequency to said transmitter coil, means to energize said oscillator from said current source, a receiver coil carried by said unit in coaxial relation to said transmitter coil for receiving a signal from earth formations proportional to their conductivity on current flow induced therein by said transmitter coil; means to transmit a signal representative of formation conductivity from said receiver coil to the earth's surface; a coil circuit of known conductivity surrounding said unit, said coil circuit including a switch; and means to calibrate said second measuring system including means whereby said second system may be shorted, and means whereby the switch in said coil circuit of known conductivity may be placed in closed circuit position to affect the input of said second measuring system; and means for recording said resistivity, said conductivity, and said natural earth potential signals on a common record medium to provide continuous correlated indications of the magnitudes thereof.

16. In a well logging system comprising apparatus for simultaneously measuring the resistivity and conductivity of earth formations traversed by a borehole, a logging tool for supporting and containing said apparatus, means for positioning said tool in a borehole adjacent an unknown formation, a calibration system for said logging tool including a first circuit of known resistivity characteristics, means for connecting said first circuit of known resistivity characteristics across the input of said apparatus to obtain a first response indication, means for adjusting the apparatus for any deviation from a predetermined response based on said characteristics of said first circuit, a second circuit of known conductivity characteristics, means for affecting the input of said apparatus by completing said second circuit of known conductivity characteristics, and means for adjusting the apparatus for any deviation from a predetermined response based on said characteristics of said second circuit.

References Cited in the file of this patent

UNITED STATES PATENTS

| | | |
|---|---|---|
| 2,582,314 | Doll | July 15, 1952 |
| 2,617,852 | Waters | Nov. 11, 1952 |
| 2,633,484 | Zimmerman | Mar. 31, 1953 |
| 2,704,347 | Doll | Mar. 15, 1955 |
| 2,723,375 | Schuster | Nov. 8, 1955 |
| 2,838,730 | Lebourg | June 10, 1958 |